Aug. 29, 1933.　　　G. B. WATKINS　　　1,924,580
PROCESS FOR SEALING LAMINATED GLASS
Original Filed May 8, 1928
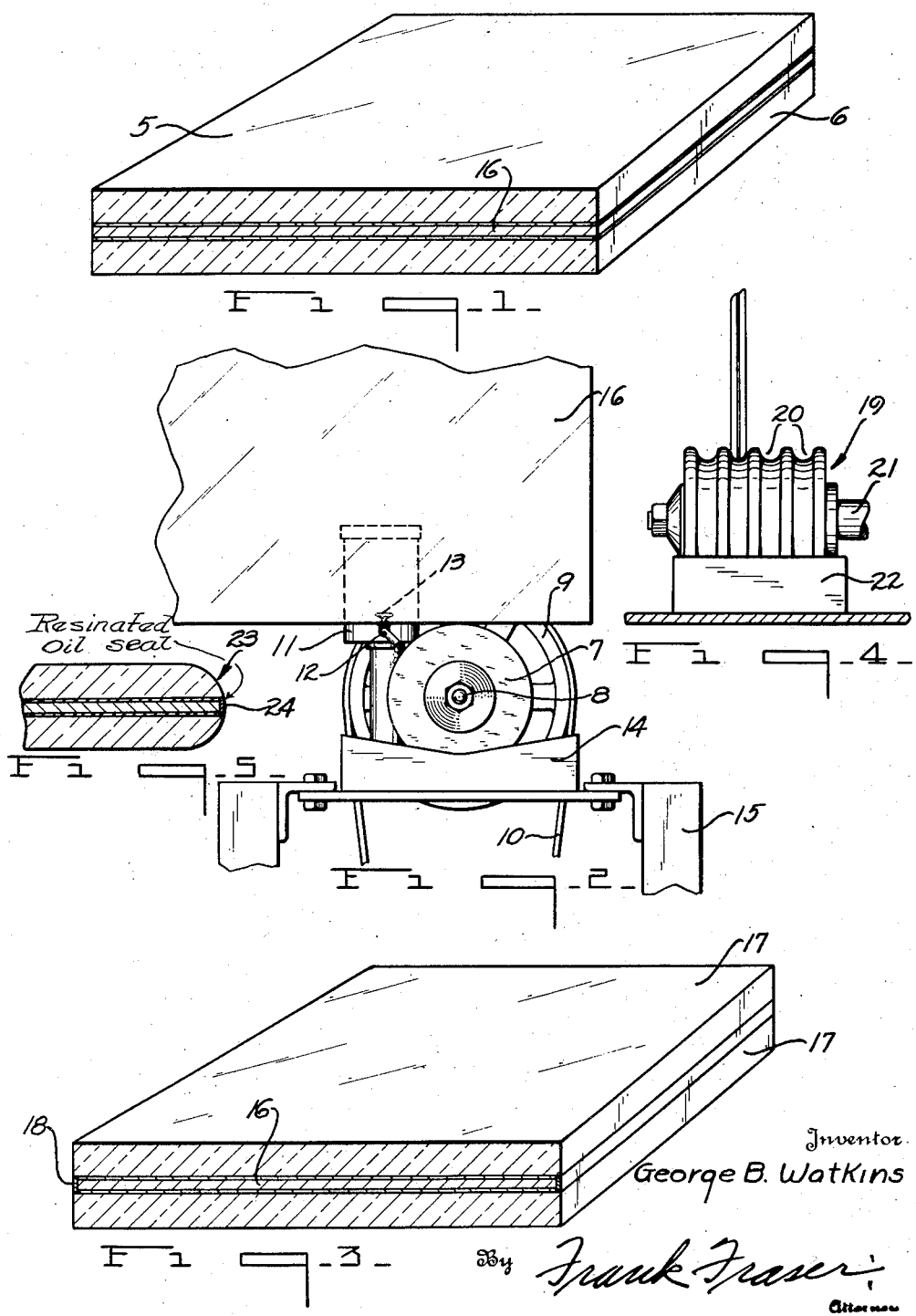
Inventor.
George B. Watkins
By Frank Fraser
Attorney Patented Aug. 29, 1933

1,924,580

UNITED STATES PATENT OFFICE 1,924,580

PROCESS FOR SEALING LAMINATED GLASS

George B. Watkins, Toledo, Ohio, assignor to Libby-Owens-Ford Glass Company, Toledo, Ohio, a corporation of Ohio Application May 8, 1928, Serial No. 276,051
Renewed February 1, 1933

10 Claims. (Cl. 49—81)

The present invention relates to a process and apparatus for sealing laminated glass.

An important object of the invention is to provide a process and apparatus for sealing laminated glass wherein the edges of the laminated sheet, after they have been preferably polished, are subjected to the action of a wheel to which is applied a suitable fluid, the heat of the wheel caused by the friction of the glass thereon softening the non-brittle sheet sufficiently to allow the fluid to penetrate the surface thereof in a manner to make it weather-proof.

Other objects and advantages of the invention will become more apparent during the course of the following description when taken in connection with the accompanying drawing.

In the drawing wherein like numerals are employed to designate like parts throughout the same, Fig. 1 is a perspective view, partially in section, of a sheet of laminated glass, Fig. 2 is an elevation illustrating the sealing of a sheet of laminated glass, Fig. 3 is a perspective view, partially in section, showing a sheet of glass after it has been sealed, Fig. 4 is an elevation of a wheel having grooves formed in its periphery, and Fig. 5 is a fragmentary sectional view of a sheet of glass which has been sealed.

Laminated glass, as is generally known, comprises two or more sheets of glass and one or more scheets of non-brittle material all bonded together to form a composite structure. With some types of processes it is important that the laminated sheets be sealed to prevent separation of the laminations when subjected to atmospheric conditions, etc.

In carrying out the present invention, a sheet of laminated glass 5 preferably has its edges 6 ground and polished. The edges may be left square as illustrated or they may be rounded where so desired. In any event, it is preferred that the desired finish be formed on the sheet edges before my sealing process.

Referring to Fig. 2, the numeral 7 designates a sealing wheel which may be formed from cork, felt, or some similar material. The wheel 7 is carried by a shaft 8 having connection with a drive wheel 9 deriving power from a belt or the like 10. Arranged in proximity to the wheel 7 is a receptacle 11 containing my improved mixture which flows from the receptacle through a spout 12 controlled by a valve 13. It is preferred that the mixture be allowed to flow upon the periphery of the wheel 7. Mounted beneath the wheel 7 is a catch basin or receptacle 14 mounted on the supports 15. The sheet 16 to be sealed is adapted to be moved in a manner that the periphery of the wheel 7 comes in contact with the edge of the laminated sheet to be sealed.

Although the sheet 16 is illustrated as being in a vertical position and above the wheel 7, it is to be understood that the sheet and wheel 7 can be arranged in any desired relative positions whether they be horizontal or vertical and regardless of which one is above the other, or beside the other. In other words, this invention contemplates any arrangement whereby a sealing wheel 7 can be brought into contact with the edge of the laminated sheet to be sealed.

The material used as a sealing medium is a drying oil, such as boiled linseed oil, to which is added a paint drier and resin. I have found that the heat generated by reason of contact between the laminated sheet edge and the sealing wheel is such that the resinated oil is caused to penetrate the surface of the non-brittle sheet sufficiently to weather-proof the lamination. In other words, it is not necessary to channel the laminated sheet before it is sealed. In the past, when it has been desired to seal a sheet of laminated glass, a suitable channel is formed around the same and the sealing medium placed in said channel. In the present case, however, the non-brittle sheet 16, which may be a cellulose composition material or the like, may be made the same size as the glass sheets 17 on either side thereof. Then the resinated oil, when applied by means of a wheel or the like 7 formed from cork, felt, or some similar material, penetrates the non-brittle sheet sufficiently to weather-proof the same. The numeral 18 in Fig. 3 represents the protective film formed by my improved mixture as applied by the wheel or disc 7. In actual commercial use a seal formed in this manner has proved to be entirely satisfactory and is desirable because it is, practically speaking, invisible except when viewed from the edges of the sheet only.

Referring to Fig. 4, the numeral 19 designates a sealing wheel having a plurality of grooves 20 formed in its periphery, although a single groove can be used. The wheel 19 may also be made from cork, felt, etc. and is rotatably mounted on a shaft 21. The resinated oil used may be contained in the receptacle 22 or the oil may be applied intermittently by a sponge or continuously by a feed means similar to that shown in Fig. 2.

In many instances it is necessary that the laminated sheet edges be rounded as at 23 in Fig. 5. The rounded edges can be formed by the well known Weber edging machine or the like. As a matter of fact, the edges can be ground round and then sufficiently polished by the sealing wheel. To seal the edges, the glass may be positioned as illustrated and then moved back and forth through the groove while the wheel is being rotated. The resinated oil will then penetrate the non-brittle sheet to create the seal 24 in Fig. 5. The grooves 20 may be made in different sizes so that the wheel will accommodate different thicknesses of sheets.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of sealing laminated glass, consisting in applying the sealing medium to the laminated sheet by means of a rotating surface operated in a manner to create sufficient friction to cause the sealing medium to penetrate the edge portion of the non-brittle sheet.

2. The process of sealing laminated glass, wherein a sheet of non-brittle material is interposed between and united to two sheets of glass, which consists in passing the edge of the sheet to be sealed in contact with a moving surface, creating sufficient friction between the two surfaces to effect a softening of the non-brittle material, and in causing said surface to feed a sealing medium into contact with the softened portion of the non-brittle material concurrently with the softening thereof.

3. The process of sealing laminated glass wherein a sheet of non-brittle material is interposed between and united to two sheets of glass, which consists in heating the edge to be sealed, and simultaneously feeding the sealing material into contact with said edge by said heating means.

4. The process of sealing laminated glass wherein a sheet of non-brittle material is interposed between and united to two sheets of glass, which consists in subjecting the edge of the sheet to the action of a rotatable heating member, and simultaneously feeding the sealing material into contact with said edge by said rotatable heating member.

5. In an apparatus for sealing the edges of laminated sheet glass, a rotatable compressible sealing wheel, and means supplying a sealing medium to the periphery of said wheel.

6. In an apparatus for sealing the edges of laminated sheet glass, a rotatable sealing wheel formed of a resilient material, and means for supplying a sealing medium to the periphery of said wheel.

7. In an apparatus for sealing the edges of laminated sheet glass, a rotatable sealing wheel formed of cork, and means for supplying a sealing medium to the periphery of said wheel.

8. In an apparatus for sealing the edges of laminated sheet glass, a rotatable sealing wheel formed of felt, and means for supplying a sealing medium to the periphery of said wheel.

9. In an apparatus for sealing the edges of laminated sheet glass, a rotatable sealing wheel having a continuous groove formed in the periphery thereof and within which the edge of the laminated sheet to be sealed is adapted to be received, and means for supplying a sealing medium to said groove.

10. In an apparatus for sealing the edges of laminated sheet glass, a sealing wheel rotatable about a substantially horizontal axis, said wheel being formed of a resilient material and having a continuous groove formed in the periphery thereof and within which the edge of the laminated sheet to be sealed is adapted to be received, and means for supplying a sealing medium to said groove.

GEORGE B. WATKINS.